(12) United States Patent
Shiono et al.

(10) Patent No.: US 8,171,409 B2
(45) Date of Patent: May 1, 2012

(54) INTERFACE FOR PRINT CONTROL

(75) Inventors: Fusahiro Shiono, Osaka (JP); Yoshiaki Tanaka, Kyoto (JP); Yukio Matsuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 430 days.

(21) Appl. No.: 11/133,825

(22) Filed: May 19, 2005

(65) Prior Publication Data

US 2006/0071903 A1 Apr. 6, 2006

(30) Foreign Application Priority Data

Oct. 1, 2004 (JP) ................................. 2004-290141

(51) Int. Cl.
*G06F 17/40* (2006.01)
*G06F 3/048* (2006.01)

(52) U.S. Cl. .......................... 715/707; 715/222; 715/745

(58) Field of Classification Search ................... 715/506, 715/505, 511
See application file for complete search history.

(56) References Cited

U.S. PATENT DOCUMENTS

| 5,774,118 A * | 6/1998 | Hatakama ..................... 715/707 |
| 7,159,190 B2 * | 1/2007 | Perry ............................. 715/825 |
| 7,339,686 B1 * | 3/2008 | Ward et al. ................... 358/1.13 |
| 2004/0046797 A1 * | 3/2004 | Perry ............................ 345/771 |
| 2004/0136023 A1 * | 7/2004 | Sato .............................. 358/1.13 |

FOREIGN PATENT DOCUMENTS

| JP | 09-044332 | | 2/1997 |
| JP | 09-104151 | * | 4/1997 |
| JP | 11-296323 | | 10/1999 |
| JP | 2002-312092 | | 10/2002 |
| JP | 2004-038739 | | 2/2004 |
| JP | 2004-046902 | | 2/2004 |

* cited by examiner

*Primary Examiner* — Namitha Pillai

(74) *Attorney, Agent, or Firm* — David G. Conlin; Steven M. Jensen; Edwards Wildman Palmer LLP

(57) ABSTRACT

In a printer driver 1, user interface UI-1 is displayed in the beginning and setup items are displayed in the respective display forms of the basic level on this user interface UI-1. In this state, basic explanations or detailed explanations are omitted. In addition, user interface UI-2 is displayed when the "Other Features" button is pressed in user interface UI-1 and setup items are displayed in the respective display forms of the applied level on this user interface UI-2. In this state, basic explanations or detailed explanations etc. concerning print control information entered via the setup items are displayed, which makes it possible to learn what type of information the print control information is.

8 Claims, 7 Drawing Sheets

FIG. 4

| Setup Items | Basic level | Applied Level | | | Classification | Frequency of use |
|---|---|---|---|---|---|---|
| | | Explanation | Image | Compatible settings | | |
| 1 | Number of copies | Please specify the number of copies to be printed | | Collate, N-Up printing, booklet printing, .... | Basic level | 83 |
| 2 | Collate | When the "number of copies" setting is two or more, determines whether to print on a page-by-page basis (in case of two copies of a two-page document, print page 1, page 1, page 2, page 2, etc.) or print on a copy by copy basis (in case of two copies of a two-page documents, print page 1, page 2, page 1, page 2... | 1 1 2 2 | Number of copies, N-up, booklet printing | Basic level | 55 |
| 3 | N-Up printing | 4-up option: Please select this feature when reducing each page in size to print 4 pages per page.2-up option: Please select this feature when reducing each page in size to print two pages per page.... | 1 2 3 4 | Booklet printing, double-sided printing | Applied level | 15 |
| 4 | ..... | Use if you want to create brochures and books using the double-sided printing feature of the printer. | | ..... | Applied level | 2 |
| | ..... | Print on the front and back side of the paper. Horizontal or vertical binding is possible depending on the direction of binding. | | ..... | Applied level | 35 |

FIG.10

| Basic Level | First Applied Level | Second Applied Level |
|---|---|---|
| Number of copies | Message: "Please enter number of copies to print" | Animation displayedAnimation shows three copies of a document appearing from a printer. |
| Collate | Message displayed: "When printing multiple copies, prints on a copy-by-copy basis. If the option is turned off, printing is on a page-by-page basis.···" | Animation displayedAnimation shows three copies of a document appearing from a printer, with each copy made up of pages 1 to 3. |
| N-Up printing | Message displayed: "Fit several pages on a single sheet of paper." | Animation displayedAnimation shows multiple pages being fitted on a single sheet of paper in accordance with the settings |
| . . . | . . . | . . . |

INTERFACE FOR PRINT CONTROL

BACKGROUND OF THE INVENTION

This Application claims priority under 35 U.S.C. §119(a) based on Patent Application 2004-290141 filed in Japan on Oct. 1, 2004, the entire content of which is incorporated in the present Application by reference.

The present invention relates to an interface for entering print control information used for print control of a printer via the screen of a display device.

Conventional devices of this type have been described in Japanese Unexamined Patent Application Publication No. Hei 11-296323 (hereinafter called Patent Document 1) and in Japanese Unexamined Patent Application Publication No. 2002-312092 (hereinafter called Patent Document 2). In Patent Document 1, screens used to enter print control information for print control of a printer are switched in accordance with the model name of the printer, the usage status of printer ports, and the level of the user. More specifically, screen layouts with a mutually different number of print control information items that can be entered and set up are prepared in advance and any of these screen layouts can be selectively displayed in accordance with the level of the user, etc.

In addition, in Patent Document 2, setup items with a high frequency of use by the user are displayed at the top of the interface screen, or, alternatively, only setup items with a high frequency of use are displayed on the interface screen.

Patent Document 1, however, amounts to no more than changing the number of print control information items that can be entered and set up on screen by selectively displaying any of the screen layouts in accordance with the level of the user, etc., and does not go as far as changing icons and explanations etc. concerning the print control information items in accordance with the level of the user.

In addition, Patent Document 2 amounts to no more than providing a prioritized display of setup items with a high frequency of use by a user and does not go as far as changing icons and explanations etc. concerning print control information in accordance with the level of the user.

Specifically, for example, despite the presence of simple print control information, which is frequently used, and complex print control information, which is practically unused, icons and explanations etc. concerning the print control information are not changed in accordance with the level of the user. As a result, this created the inconvenience that even if a user did not need basic explanations etc. concerning simple print control information, the explanations etc. were still displayed, impeding input operations, and even if a user wanted to read detailed explanations concerning complex print control information, the user could not obtain such explanations.

SUMMARY OF THE INVENTION

Thus, the present invention was made in view of the above-mentioned conventional problems and it is an object of the invention to provide an interface that offers improved convenience by changing the display forms of setup items used to enter print control information in accordance with the level of the user.

In order to achieve the above object, the interface of the present invention, which is an interface for displaying setup items used to enter print control information for print control of a printer on screen and for entering print control information via the setup items, comprises a storage means for storing the display forms of the setup items separately for a plurality of levels, and a control means for displaying the setup items on screen by selectively using the display forms of different levels from the storage means.

In this configuration, preparing the display forms of different levels so as to make them correspond to several user levels allows for setup items to be displayed in display forms matching the level of the user, thereby improving convenience.

In this configuration, it is also possible to provide an input operation means for selecting and specifying any of the levels from the storage means, and the control means may display setup items on screen using the display forms of the levels selected and specified by the input operation means. By doing so, setup items can be displayed in the display form of the level desired by the user.

In this configuration, it is further possible to provide a list display means for displaying a plurality of setup items in the form of a list separately for different levels, and the input operation means may be configured to move setup items between various levels displayed by the list display means in order to select and specify the level of the setup items. By using such a method for setting the level of setup items, the level of the setup items can be easily appreciated as well as changed and set up.

In addition, in accordance with the present invention, it is possible to provide a frequency-of-use storage means for obtaining and storing the frequency for each of the display forms of different levels contained in the storage means, and the control means may display setup items on screen by selectively using the display forms of different levels based on the frequency of use of the display forms of different levels in the frequency-of-use storage means. For instance, as the frequency of use decreases, setup items are displayed in a more detailed display form to support the comprehension of the print control information entered via the setup items, and, as the frequency of use increases, setup items are displayed in a more simplified display form to eliminate unnecessary displays and facilitate operative input.

Furthermore, the interface of the present invention may be provided with an input operation means for specifying setup items on screen and the control means may be configured for on-screen display of other setup items that can be specified in combination with the setup items specified by the input operation means. Doing so facilitates the of use a plurality of setup items in combination and allows for avoiding unnecessary operations such as selecting and specifying incompatible setup items.

In addition, in accordance with the present invention, forms that can be set up as display forms of different levels may include, respectively, simple displays of setup items and detailed displays of setup items, textual explanations of setup items, still images illustrating setup items, or moving images illustrating setup items, all of which may be used in a selective manner.

BRIEF DESCRIPTION OF THE DRAWINGS

FIG. 4 is a diagram that conceptually illustrates a setup item list and a frequency-of-use table used in the interface of FIG. 1.

FIG. 10 is a diagram illustrating display forms of setup items used in the present embodiment separately for a basic level, a first applied level, a second applied level, etc.

DESCRIPTION OF THE PREFERRED EMBODIMENTS

Hereinbelow, embodiments of the present invention are explained in detail by referring to the accompanying drawings.

Figure 1:
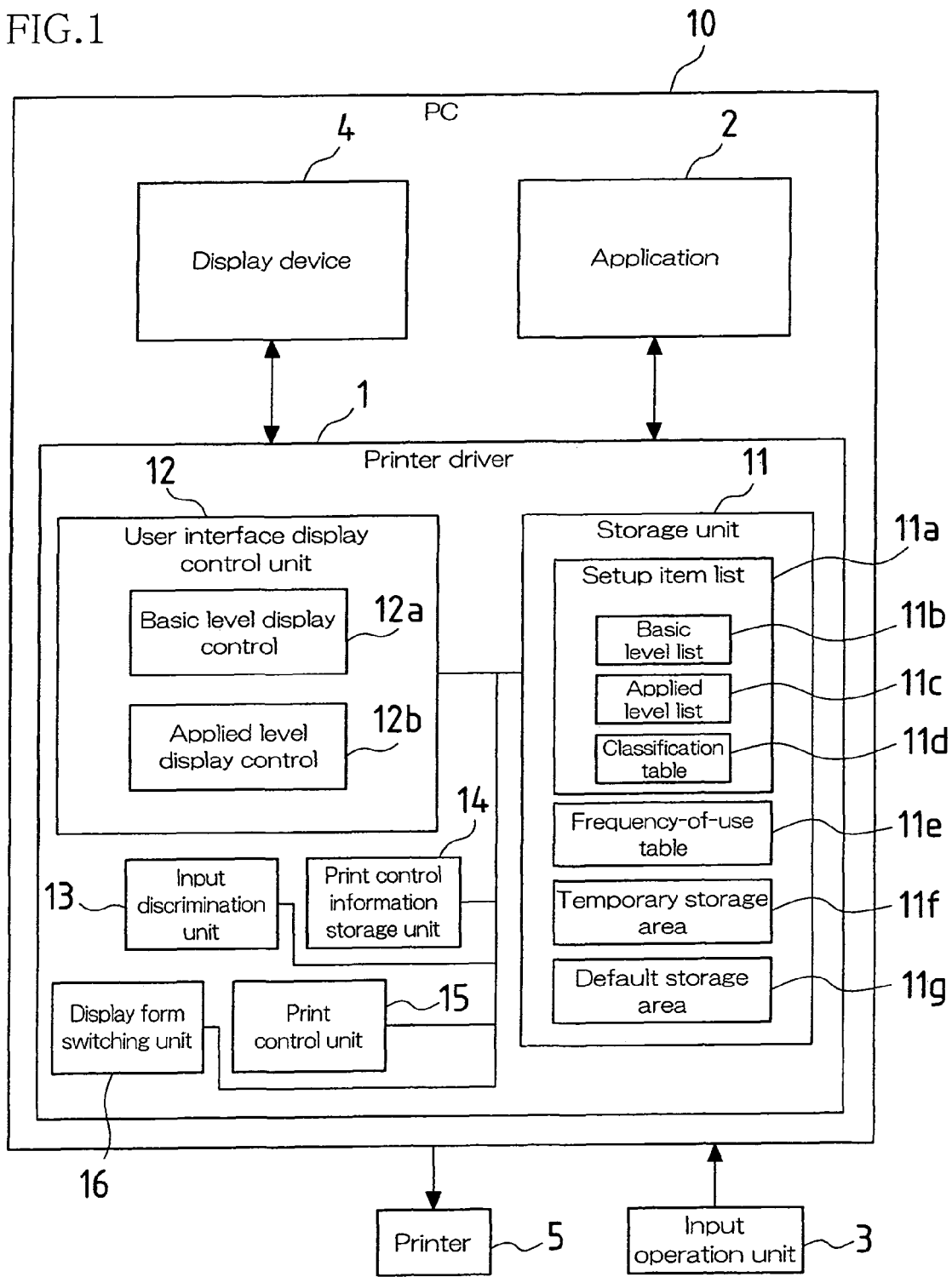
FIG. 1 is a block diagram that conceptually illustrates a personal computer utilizing an embodiment of the interface of the present invention.

FIG. 1 is a block diagram that conceptually illustrates a personal computer utilizing an embodiment of the interface of the present invention.

In a personal computer 10, a printer driver 1 and application software 2 are run by an operating system (not shown). In addition, a display device 4 is controlled and processing, such as word processing and spreadsheet calculation, etc., is carried out by the application software 2 in response to input from an input operation unit 3, such as a keyboard or a pointing device, and, in addition, the display device 4 and the printer 5 are controlled by the printer driver 1.

The printer driver 1 is provided with a storage unit 11, which stores various kinds of information used for display a user interface, a user interface display control unit 12, which displays the user interface on the screen of a display device 4 based on the information stored in the storage unit 11, an input discrimination unit 13, which carries out input discrimination of print control information passing through the user interface, a print control information storage unit 14, which stores entered print control information, a print control unit 15, which effects print control of a printer 5, and a display form switching unit 16, which is used to switch and set the level of the display forms of the setup items displayed on the user interface.

In such a configuration, when an instruction to print text, tables, or other data is issued as a result of input operations performed using the input operation unit 3, the application software 2 calls and activates the printer driver 1 via the operating system and transmits data to the printer driver 1.

Figure 2:
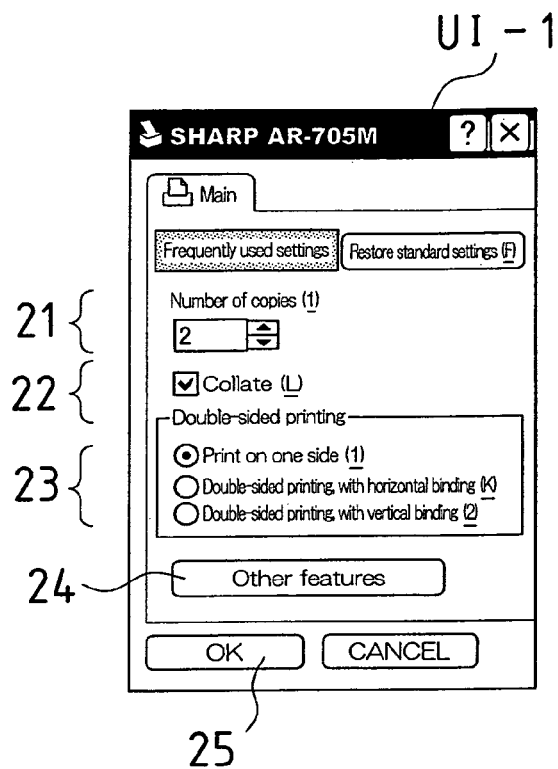
FIG. 2 is a diagram illustrating a user interface displayed by the interface of FIG. 1.
Figure 3:
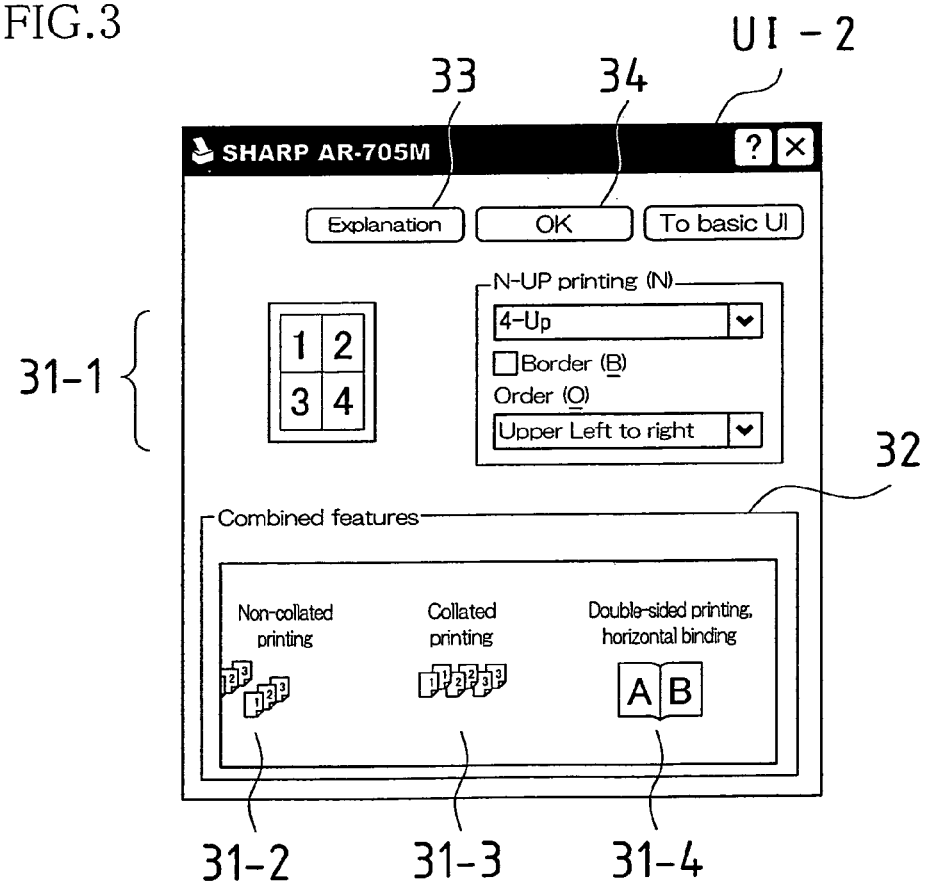
FIG. 3 is a diagram illustrating another user interface displayed by the interface of FIG. 1.

In the printer driver 1, processing by the user interface display control unit 12 starts when it is called and activated by the application software 2. That is to say, the user interface display control unit 12 displays, for example, user interfaces UI-1, UI-2 as shown in FIG. 2 and FIG. 3, on the screen of the display device 4 based on the information stored in the storage unit 11. Then, when the number of pages, the paper size, and other print control information is written and entered in the setup items of the user interfaces UI-1 and UI-2 as a result of input operations performed using the input operation unit 3, the input discrimination unit 13 stores the print control information in the print control information storage unit 14 and, in addition, also stores it in the storage unit 11. After that, the print control unit 15 effects print control of the printer 5 based on the print control information stored in the storage unit 11 to print out text, tables, and other data on printing paper using the printer 5.

In this manner, the print control of the printer 5 is carried out by the printer driver 1 based on the respective print control information entered via the setup items of the user interfaces UI-1, UI-2, etc.

Incidentally, as the frequency of use and comprehension by the user are different for each print control information item, the user needs basic explanations or detailed explanations, etc. concerning print control information items if the frequency of use and the level of comprehension are low and does not need basic explanations or detailed explanations, etc. concerning print control information items and would rather omit such explanations in order to perform input operations quickly if the frequency of use and the level of comprehension are high.

Thus, in the printer driver 1 of the present embodiment, the display forms of the setup items in the user interface used to enter print control information are changed in accordance with the level of the user, thereby improving convenience.

Next, explanations are provided concerning configuration and processing used to change the display forms of the setup items in the user interface in this manner.

The storage unit 11 of the printer driver 1 includes a setup item list 11*a*, which records the classification and display forms of the setup items of the user interface, a frequency-of-use table 11*e*, which records the frequency of use of the setup items, a temporary storage area 11*f*, which temporarily stores the respective print control information entered via the setup items, and a default storage area 11*g*, which stores the default values of the print control information of the setup items.

The setup item list 11*a* includes a basic level list 11*b*, which records the respective display forms used when displaying setup items at the basic level, an applied level list 11*c*, which records the respective display forms used when displaying setup items at the applied level, and a classification table 11*d*, which records setup items by classifying them as belonging to the basic or applied level.

The display forms of setup items at the basic level are the display forms used when the frequency of use of the setup items is equal to or higher than a constant value. In addition, the display forms of setup items at the applied level are the display forms used when the frequency of use of the setup items is less than a constant value.

FIG. 4 conceptually illustrates the basic level list 11*b*, the applied level list 11*c*, the classification table 11*d*, and the frequency-of-use table 11*e*.

In FIG. 4, the respective character strings etc. describing setup items in the simplest way possible are recorded in the basic level list 11*b* as the respective display forms used when displaying setup items at the basic level. For example, "Number of copies", "Collate", etc.

In addition, textual explanations and still images are recorded in the applied level list 11*c* as the respective display forms for displaying setup items at the applied level. The display forms of the applied level provide an indication of the print control information entered through the setup items and show basic explanations or detailed explanations, etc. concerning the print control information.

In addition, in the applied level list 11*c*, for every setup item, there are recorded other setup items that can be specified in combination with the setup item.

Furthermore, in the classification table 11*d*, for every setup item, there is a record as to whether the setup item is classified as belonging to the basic level or as belonging to the applied level.

In addition, in the frequency-of-use table 11e, for every setup item, there is a record of the frequency with which print control information has been entered via the setup item, in other words, the frequency of use of the setup item.

Figure 5:
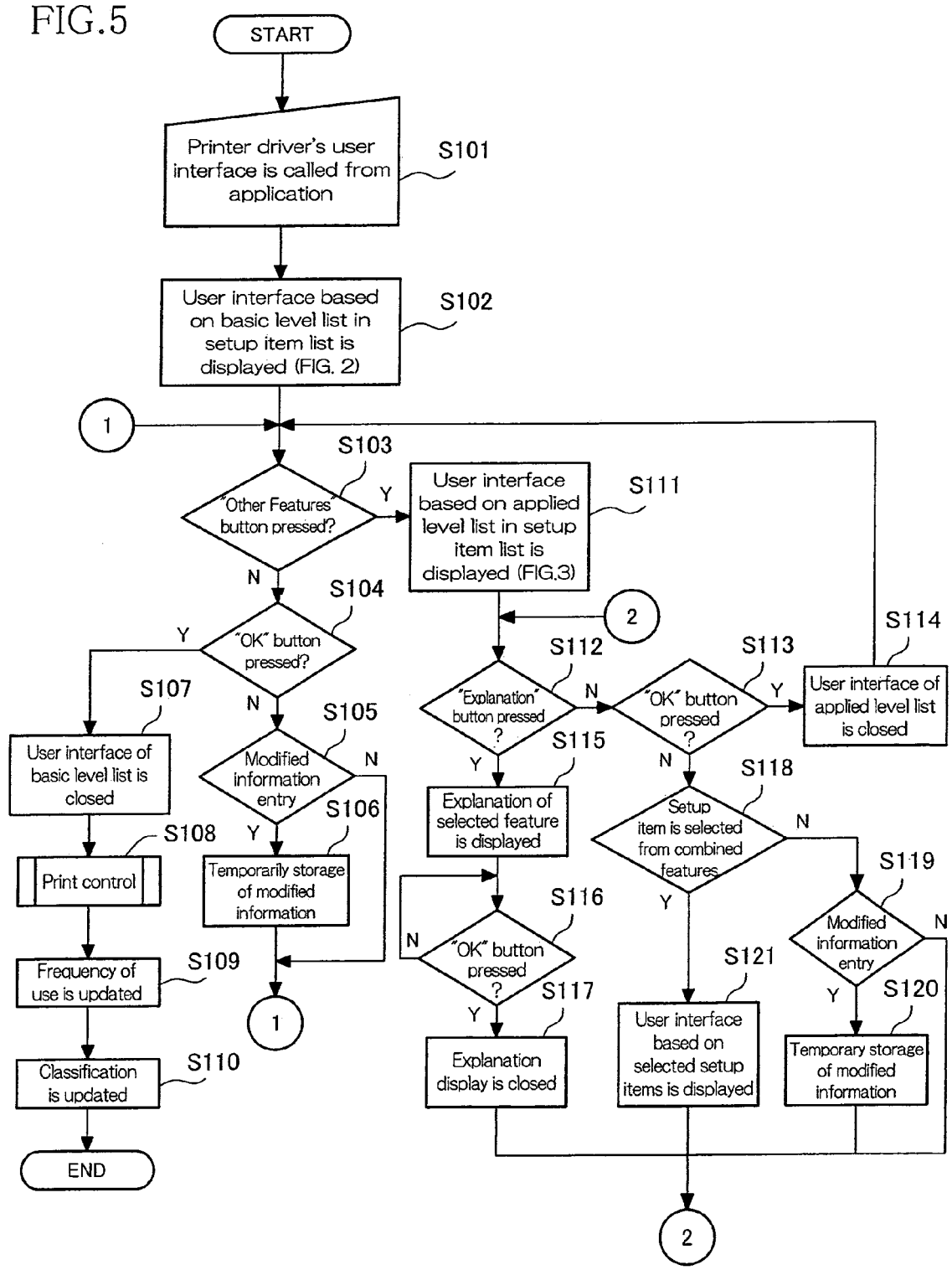
FIG. 5 is a flowchart illustrating the display process of the user interface generated by a printer driver in the interface of FIG. 1.

The display process of the user interface generated by the printer driver 1 is explained next with reference to the flowchart shown in FIG. 5.

First of all, in the printer driver 1, processing by the basic level display control unit 12a of the user interface display control unit 12 starts when it is called and activated by the application software 2 (step S101). When the processing starts, the basic level display control unit 12a retrieves the classification table 11c of the setup item list 11a and extracts all the setup items classified as belonging to the basic level in the classification table 11c. Then, the basic level display control unit 12a retrieves the basic level list 11b, obtains the respective display forms that are used when the extracted setup items are displayed at the basic level, displays user interface UI-1 shown in FIG. 2 on the screen of the display device 4, and displays the extracted setup items 21 to 23 in user interface UI-1 in the respective display forms of the basic level (step S102).

As described above, the display forms of the basic level are the simplest display forms of the setup items, so that, in user interface UI-1, setup items are displayed in the respective simplest display forms and basic explanations or detailed explanations are omitted. As a result, input operations can be carried out quickly.

In such a user interface UI-1, when print control information is entered via any of the setup items 21 to 23 ("No" in steps S103 and S104) as a result of input operations performed using the input operation unit 3 while pressing neither the "Other Features" button 24 nor the "OK" button 25, the input discrimination unit 13 makes a judgment as to the input of the print control information ("Yes" in step S105) and temporarily stores the print control information in the print control information storage unit 14 (step S106). Then, steps S103 to S106 are repeated whenever print control information is entered via the setup items.

Thus, when the input of print control information in user interface UI-1 is terminated, the "OK" button 25 is pressed as a result of an input operation performed using the input operation unit 3 ("Yes" in step S104). When the "OK" button 25 is pressed, the basic level display control unit 12a shuts down user interface UI-1 displayed on the screen (step S107). In addition, when the "OK" button 25 is pressed, the print control unit 15 moves the print control information in the print control information storage unit 14 to the temporary storage area 11f. If, in addition to the print control information contained in the temporary storage area 11f, there is other print control information required for printing text, tables, and other data from application software 2, the print control unit 15 reads default values for the other print control information from the default storage area 11g. Furthermore, the print control unit 15 effects print control of the printer 5 based on the print control information read from the default storage area 11g as well as the print control information contained in the temporary storage area 11f and prints the data such as text and tables from the application software 2 on printing paper using the printer 5 (step S108).

In addition, the print control unit 15 increments the frequency of use of those setup items in the frequency-of-use table 11e, for which the input of the print control information has been carried out, and updates the frequency of use (step S109). Then, the display form switching unit 16 makes a judgment as to whether the updated frequency of use is equal or greater than a constant value, and sets the classification of the setup items in the classification table 11d to the basic level if it is equal or greater than the constant value and sets the classification of the setup items in the classification table 11d to the applied level if it is less than the constant value (step S110).

In addition, in user interface UI-1, the applied level display control unit 12b of the user interface display control unit 12 is activated when the "Other Features" button 24 is pressed as a result of input operations performed using the input operation unit 3 ("Yes" in step S103). When activated, the applied level display control unit 12b retrieves the classification table 11c of the setup item list 11a and extracts a single item from all the setup items classified as belonging to the applied level in the classification table 11c. For instance, the setup item having the highest frequency of use is extracted from the setup items classified as belonging to the applied level. Then, by referring to the applied level list 11c, the applied level display control unit 12b extracts other setup items that can be specified in combination with the extracted setup item. Furthermore, the applied level display control unit 12b obtains the respective still images used when displaying the extracted setup items at the applied level, displays user interface UI-2 shown in FIG. 3 on the screen of the display device 4, and displays setup items 31-1 to 31-n as the respective still images of the applied level in user interface UI-2 (step S111).

At such time, the initially extracted setup item 31-1 is displayed to the left of the center in user interface UI-2 and at least some of the other setup items 31-2 to 31-n that can be specified in combination with setup item 31-1 are displayed in user interface UI-2 on a scrolling screen 32. Then, when an instruction to scroll the scrolling screen 32 is issued as a result of input operations performed using the input operation unit 3, the applied level display control unit 12b displays the setup items 31-2 to 31-n in motion on the scrolling screen 32 and displays all the setup items 31-2 to 31-n one by one.

In such a user interface UI-2, when the "Explanation" button 33 is not pressed ("No" in step S112) and the "OK" button 34 is pressed ("Yes" in step S113), the applied level display control unit 12b shuts down user interface UI-2 (step S114). By doing so, control is returned to step S103, entering stand-by for further input operations in user interface UI-1.

Figure 6:
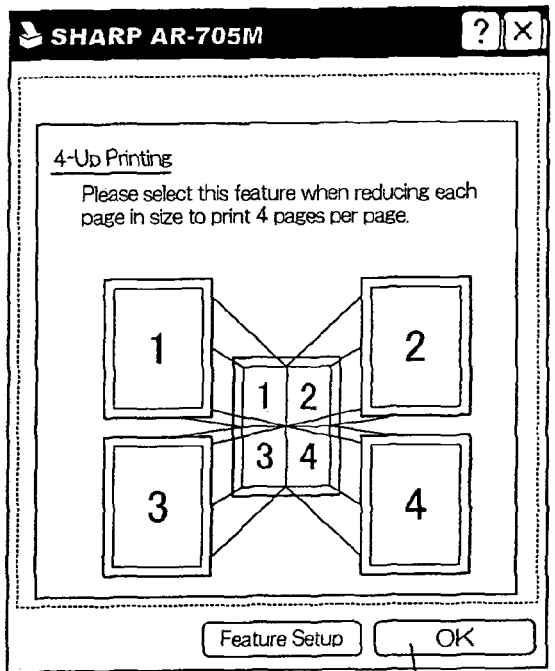
FIG. 6 is a diagram illustrating an example of updating the user interface of FIG. 3.

In addition, when the "Explanation" button 33 is pressed ("Yes" in step S112), the applied level display control unit 12b retrieves the applied level list 11c and obtains basic explanations or detailed explanations etc. concerning the print control information entered via setup item 31-1 located to the left of the center in user interface UI-2 and these basic explanations or detailed explanations, etc. are displayed in user interface UI-2 as shown in FIG. 6 (step S115).

As a result, even if the frequency of use of setup item 31-1 is low, one can learn what type of print control information is entered via setup item 31-1.

Subsequently, in user interface UI-2 of FIG. 6, when the "OK" button 34 is pressed ("Yes" in step S116), the applied level display control unit 12b clears the basic explanations or detailed explanations, etc. (step S117) from the screen, returns control to step S112, and displays user interface UI-2 of FIG. 3, entering stand-by for further input operations in user interface UI-2.

If neither the "Explanation" button 33 nor the "OK" button 34 is pressed ("No" in steps S112 and S113), and, furthermore, if none of setup items 31-2 to 31-n on the scrolling screen 32 is selected and specified ("No" in step S118) in user interface UI-2 of FIG. 3 as a result of input operations performed using the input operation unit 3, then entering print control information entered by input operations performed using the input operation unit 3 via the setup items 31-1

("Yes" in step S119) causes the input discrimination unit 13 to temporarily store this print control information in the print control information storage unit 14 (step S120). After that, control is returned to step S112, again entering stand-by for further input operations in user interface UI-2 of FIG. 3.

Figure 7:
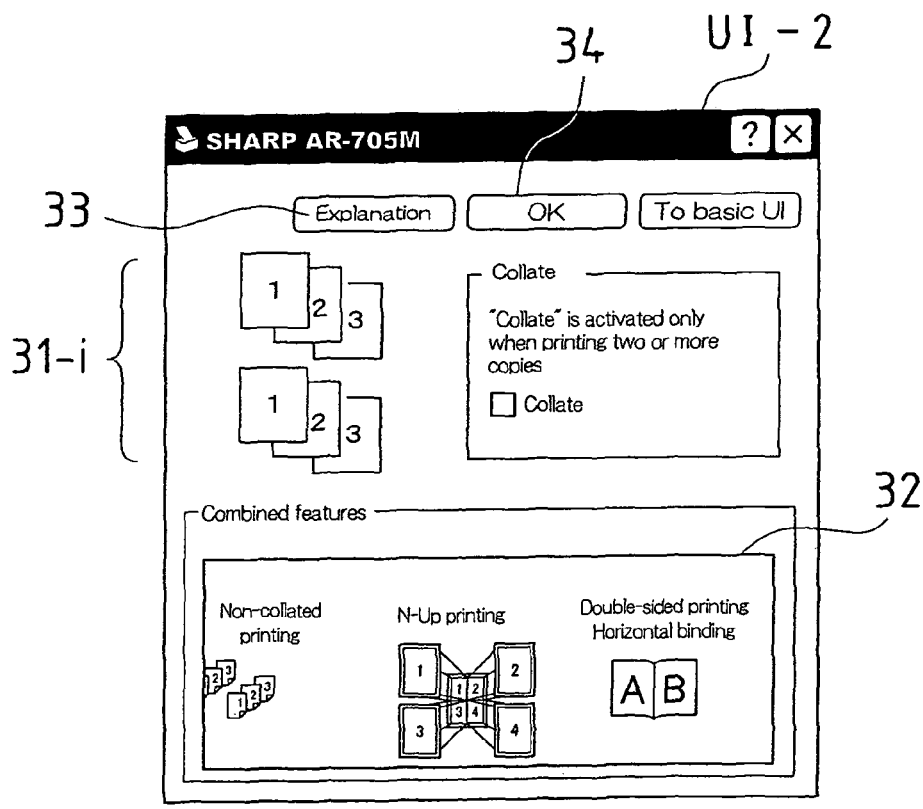
FIG. 7 is a diagram illustrating another example of updating the user interface of FIG. 3.

In addition, when any of the setup items 31-2 to 31-*n* of the scrolling screen 32 are selected and specified as a result of input operations performed using the input operation unit 3 ("Yes" in step S118), the applied level display control unit 12*b* clears setup item 31-1, which is located to the left of the center in user interface UI-2 of FIG. 3, from the screen and, instead, displays, for example, setup item 31-*i* selected and specified to the left of the center in user interface UI-2 as a still image of the applied level, as shown in FIG. 7 (step S121). In addition, by referring to the applied level list 11*c*, the applied level display control unit 12*b* extracts other setup items that can be specified in combination with the newly displayed setup item 31-*i*. Then, the applied level display control unit 12*b* obtains the respective still images used when displaying the other extracted setup items at the applied level and displays the other extracted setup items on the scrolling screen 32 as the respective still images.

After that, control is returned to step S112 and the setup item 31-*i*, which is displayed to the left of the center in user interface UI-2 of FIG. 7, is processed in the same way as the previously described setup item 31-1.

Figure 8:
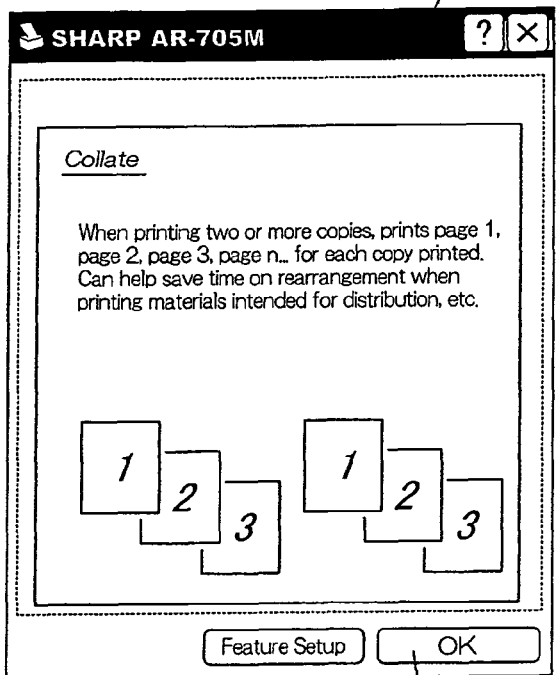
FIG. 8 is a diagram illustrating an example of updating the user interface of FIG. 7.

For instance, when the "Explanation" button 33 is pressed ("Yes" in step S112) in user interface UI-2 of FIG. 7, the applied level display control unit 12*b* retrieves the applied level list 11*c*, obtains basic explanations or detailed explanations, etc. concerning the print control information entered via the setup item 31-*i* and displays the basic explanations or detailed explanations, etc. in user interface UI-2 as shown in FIG. 8 (step S115). Then, when the "OK" button 34 is pressed ("Yes" in step S116), the applied level display control unit 12*b* clears the basic explanations or detailed explanations, etc. (step S117) from the screen, returns control to step S112, and displays user interface UI-2 of FIG. 7, entering stand-by for further input operations in user interface UI-2.

In this manner, in the present embodiment, user interface UI-1 is displayed in the beginning, with setup items displayed in user interface UI-1 in the respective display forms of the basic level. Because basic explanations or detailed explanations are omitted in this state, the input of print control information via the setup items can be carried out quickly.

In addition, when the "Other Features" button is pressed in user interface UI-1, user interface UI-2 is displayed and setup items are displayed in user interface UI-2 in the respective display forms of the applied level. Because basic explanations or detailed explanations etc. concerning the print control information entered via the setup items are displayed in this state, one can learn what type of information the print control information is.

Therefore, assuming several user levels and preparing the display forms of the setup items corresponding to these levels in advance makes it possible to display the setup items in display forms matching the level of the user, thereby improving convenience.

In addition, unnecessary displays are avoided because setup items are displayed in the display forms of the applied level when the "Other Features" button 24 is pressed as a result of input operations performed using the input operation unit 3, in other words, whenever the user so desires.

Additionally, the present invention is not limited to the above-mentioned embodiment and is amenable to various modifications. For example, above, a setup item is assumed to belong to the basic level when the frequency of use of the setup item is greater than a constant value and assumed to belong to the applied level when the frequency of use of the setup item is less than the constant value, but, instead, a setup item can be designated as belonging to either the basic level or the applied level by input operations performed using the input operation unit 3, and, for every setup item, a record may be provided in the classification table 11*d* as to whether the setup item is classified as belonging to the basic level or the applied level.

Figure 9:
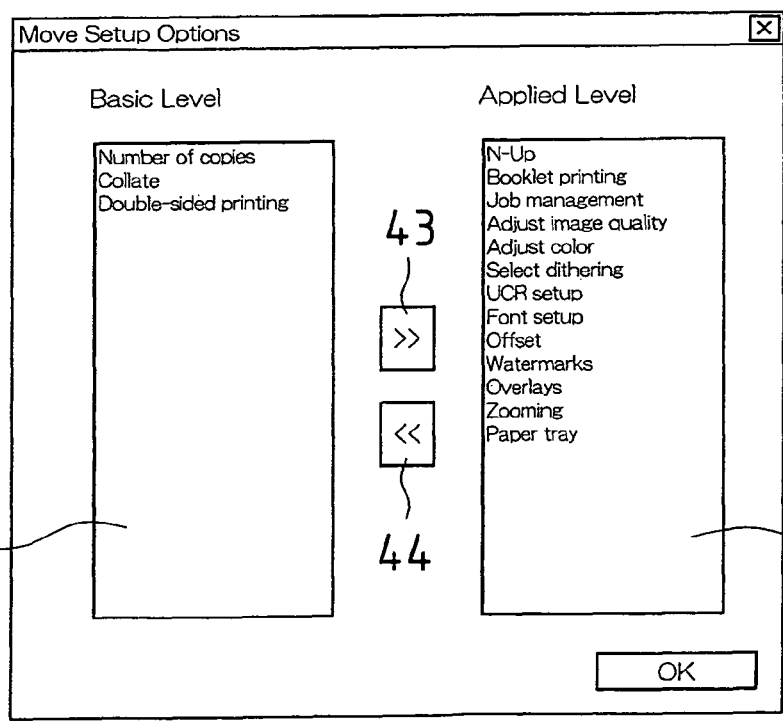
FIG. 9 is diagram showing an example of a screen used to set the level of the display forms of setup items in the present embodiment.

More specifically, as shown in FIG. 9, a column 41 of the basic level and a column 42 of the applied level are displayed on the screen of the display device 4, with the column 41 of the basic level displaying a list of setup items classified as belonging to the basic level and the column 42 of the applied level displaying a list of setup items classified as belonging to the applied level. Then, setup items listed in the column 41 of the basic level are selected by input operations performed using the input operation unit 3, and, by pressing the "Move" key 43, the setup items are moved to the column 42 of the applied level. Alternatively, setup items in the column 42 of the applied level are selected by input operations performed using the input operation unit 3 and, by pressing the "Move" key 44, the setup items are moved to the column 41 of the basic level. When setup items are moved from the column 41 of the basic level to the column 42 of the applied level, the display form switching unit 16 changes the classification of the setup items in classification table 11*d* to the applied level, and, also, when setup items are moved from the column 42 of the applied level to the column 41 of the basic level, it changes the classification of the setup items in classification table 11*d* to the basic level.

In addition, the display forms of the setup items may be classified into three or more levels. For instance, as shown in FIG. 10, the display forms of the setup items may be classified into a basic level, a first applied level, and a second applied level, for example. Here, the display forms of the basic level are the simplest character strings etc., the display forms of the first applied level are explanatory text or still images, etc., and the display forms of the second applied level are moving images.

It should be noted that the invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An interface for displaying setup items used to enter print control information for print control of a printer on a screen and for entering the print control information via the setup items, the interface comprising:

a storage means for storing display forms of the setup items separately for a plurality of levels corresponding to a user's level of comprehension and frequency of use of the display forms;

a control means for displaying the setup items on the screen by selectively using the display forms which are contained in the storage means; and a frequency-of-use storage means for obtaining and storing the frequency of use with respect to each of the display forms which are contained in the storage means, wherein the frequency of use is measured by the frequency with which the print control information has been entered via each of the setup items, wherein the storage means stores the display forms of the setup items in one of a basic level list and an applied level list according to a classification table, where any of the display forms of the setup items is selectable according to the user's level, and wherein the control means displays the setup items on the screen by selectively using the display forms of the different levels based on the frequency of use of the display forms of the different levels in the frequency-of-use storage means, such that for a particular function to be carried out, one of the display forms of the basic level list is displayed if the frequency of use of the corresponding setup item is equal to or higher than a constant value, whereas a different one of the display forms of the applied level list is displayed if the frequency of use of the corresponding setup item is less than the constant value.

2. The interface according to claim 1, further comprising:
an input operation means for selecting and specifying any of the levels in the storage means;
wherein the control means displays setup items on screen using the display forms of the levels selected and specified by the input operation means.

3. The interface according to claim 2, further comprising:
a list display means for displaying a plurality of setup items in the form of a list separately for the different levels;
wherein the input operation means moves setup items between various levels displayed by the list display means in order to select and specify the level of the setup items.

4. The interface according to claim 1, further comprising:
an input operation means for specifying the setup items on the screen;
wherein the control means displays, on the screen, other setup items that can be specified in combination with the setup items specified by the input operation means.

5. The interface according to claim 1, wherein a simplified display of setup items and a detailed display of setup items, respectively, are set up as display forms of the levels according to whether the display form of the setup item is classified as being on the basic level list or the applied level list, respectively.

6. The interface according to claim 1, wherein explanatory text concerning setup items is set up as a display form of the levels.

7. The interface according to claim 1, wherein still images illustrating setup items are set up as a display form of the levels.

8. The interface according to claim 1, wherein moving images illustrating setup items are set up as a display form of the levels.

* * * * *